US009834654B2

(12) United States Patent
Speer et al.

(10) Patent No.: US 9,834,654 B2
(45) Date of Patent: Dec. 5, 2017

(54) METHOD OF MAKING A FOAM

(75) Inventors: Drew Ve Speer, Simpsonville, SC (US); William J Mahon, Southbury, CT (US); Lorna Lu Zhao, New Milford, CT (US)

(73) Assignee: Sealed Air Corporation (US), Charlotte, NC (US)

( * ) Notice: Subject to any disclaimer, the term of this patent is extended or adjusted under 35 U.S.C. 154(b) by 198 days.

(21) Appl. No.: 14/359,797

(22) PCT Filed: Nov. 22, 2011

(86) PCT No.: PCT/US2011/061915
§ 371 (c)(1),
(2), (4) Date: Sep. 10, 2014

(87) PCT Pub. No.: WO2013/077865
PCT Pub. Date: May 30, 2013

(65) Prior Publication Data
US 2015/0197613 A1    Jul. 16, 2015

(51) Int. Cl.
*C08J 9/12* (2006.01)
*C08J 9/30* (2006.01)
*C08J 9/00* (2006.01)

(52) U.S. Cl.
CPC ............. *C08J 9/12* (2013.01); *C08J 9/0061* (2013.01); *C08J 9/122* (2013.01); *C08J 9/30* (2013.01); *C08J 2201/026* (2013.01); *C08J 2203/06* (2013.01); *C08J 2333/04* (2013.01); *C08J 2347/00* (2013.01); *C08J 2401/00* (2013.01)

(58) Field of Classification Search
CPC ... C08J 9/0061; C08J 9/12; C08J 9/122; C08J 9/30; C08J 2201/026; C08J 2203/06; C08J 2333/04; C08J 2347/00; C08J 2401/00
See application file for complete search history.

(56) References Cited

U.S. PATENT DOCUMENTS

| | | |
|---|---|---|
| 3,125,592 A | 3/1964 | Nevin |
| 3,557,840 A * | 1/1971 | Maybee ............ F16L 59/026 138/149 |
| 3,718,623 A * | 2/1973 | Lohse ............ C08G 18/3221 260/DIG. 34 |
| 4,100,318 A | 7/1978 | McCann et al. |
| 4,734,440 A | 3/1988 | Topcik |
| 4,771,078 A | 9/1988 | Schisler et al. |
| 5,945,461 A | 8/1999 | Gosiewski |
| 6,121,398 A | 9/2000 | Wool et al. |
| 6,353,037 B1 | 3/2002 | Thornhorst et al. |
| 6,465,535 B1 | 10/2002 | Eisrnan |
| 6,586,483 B2 | 7/2003 | Kolb |
| 6,646,033 B2 | 11/2003 | Wool et al. |
| 6,853,037 B2 | 2/2005 | Kudo et al. |
| 6,900,261 B2 | 5/2005 | Wool et al. |
| 2002/0128338 A1 | 9/2002 | Hird et al. |
| 2004/0072976 A1 | 4/2004 | Wool et al. |
| 2010/0055468 A1 | 3/2010 | Cheng |
| 2010/0075129 A1 * | 3/2010 | Nagasaki ............ C09J 5/06 428/313.3 |
| 2011/0159135 A1 | 6/2011 | Desmarais |
| 2011/0159206 A1 | 6/2011 | Merrigan |
| 2012/0295993 A1 * | 11/2012 | Wool ............ C08J 9/0023 521/50.5 |

OTHER PUBLICATIONS

Wu et al., Journal of Biobased Material and Bioenergy, Plastic Foams Based on Acrylated Epoxidized Soybean Oil, vol. 1, 417-426, 2007.*
Andrew Guo, et al., "Rigid Polyurethane Foams Based on Soybean Oil", Journal of Applied Polymer Science, vol. 77, 2000, pp. 467-473.
Bonnaillie, et al., "Fabrication of Structural Foams From Soybean Oil: Formulation" University of Delaware, Center for Composite Materials, Department of Chemical Engineering, 2004 (2004), entire document [online] URL=http://www.ccm.udel.edu/pubs/05posterbook/ms/bonnaillie_fabricationstructural_poster2004.pdf.
John La Scala, et al., "Property analysis of triglyceride-based thermosets", Polymer, vol. 46, Issue 1, Jan. 6, 2005, pp. 61-69.
John La Scala, et al., "Rheology of chemically modified triglycerides", Journal of Applied Polymer Science, vol. 95, Issue 3, Feb. 5, 2005, pp. 774-733.
Laetitia M. Bonnaillie, et al., "Thermosetting Foam with a High Bio-Based Content from Acrylated Epoxidized Soybean Oil and Carbon Dioxide", Journal of Applied Polymer Science, vol. 105, 2007, pp. 1042-1052.
Laetitia M. Bonnaillie, "Bio-Based Polymeric Foams From Soybean Oil and Carbon Dioxide", A dissertation submitted to the Faculty of the University of Delaware in partial fulfillment of the requirements for the degree of Doctor of Philosophy in Chemical Engineering, Fall 2007, pp. 1-255.
Min Zhi Rong, et al., "Ecomaterials-Foam Plastics Synthesized From Plant Oil-Based Resins", Materials Science Forum, vols. 539-543, 2007, pp. 2311-2316.
Jeffrey Klang, PHD, et al., "Design and Performance of Radiation Curable Acrylates with High Renewable Carbon Content", Presented at RadTech 2010 Technology Expo and Conference May 2010.
Zoran S. Petrovic, "Polyurethanes from Vegetable Oils", Polymer Reviews, vol. 48, 2008, pp. 109-155.
Jonny J. Blaker, et al,, "Renewable (greener) nanocomposite polymer foams synthesised from Pickering emulsion templates", Green Chemistry, vol. 11, 2009, pp. 1321-1326.
Richard P. Wool, "Bio-Based Thermoset Foams from Soybean Oil and Carbon Dioxide.", Department of Chemical Engineering, University of Delaware [Presentation], Jan. 14, 2009.

* cited by examiner

*Primary Examiner* — Irina S Zemel
(74) *Attorney, Agent, or Firm* — Daniel B. Ruble

(57) ABSTRACT

A method of making a foam comprising the following steps. A mixture is created comprising (i) a first reactant comprising triglyceride having acrylate functionality, (ii) a second reactant comprising diacrylate, and (iii) a blowing agent. The mixture is expanded to create a froth. The first and second reactants of the froth are reacted to create the foam.

23 Claims, No Drawings

METHOD OF MAKING A FOAM

This application is the National Stage (35 U.S.C. §371) of International Application No. PCT/US2011/061915 filed Nov. 22, 2011, which is incorporated herein in its entirety by reference.

The presently disclosed subject matter relates to foam (i.e., cellular plastic), for example, foam produced using one or more sustainably produced reactants.

SUMMARY

One or more embodiments of the disclosed subject matter are directed to methods of making a foam comprising the following steps. A mixture is created. The mixture comprising (i) a first reactant comprising triglyceride having acrylate functionality, (ii) a second reactant comprising diacrylate, and (iii) a blowing agent. The mixture is expanded to create a froth. The first and second reactants of the froth are reacted to create the foam.

One or more embodiments provide, for example, for producing lower density foams while using one or more sustainably-produced reactants, such as acrylated triglyceride, in manufacture of the foam.

These and other objects, advantages, and features will be more readily understood and appreciated by reference to the detailed description.

DETAILED DESCRIPTION

Various embodiments of the presently disclosed subject matter are directed to methods of making a foam. A mixture is created comprising a first reactant comprising triglyceride having acrylate functionality and a second reactant comprising diacrylate. The mixture may optionally comprise a third reactant comprising monoacrylate or acrylate having functionality of three or more. The mixture further comprises blowing agent. The mixture is expanded to create a froth comprising the reactants, surfactant, and blowing agent. The reactants of the froth are reacted to solidify the foam matrix and create the foam.

First Reactant

The mixture comprises a first reactant comprising triglyceride having acrylate functionality. Useful first reactants may include triglyceride derived from plant, such as one or more of any of soybean oil, linseed oil, castor oil, cotton oil, corn oil, sunflower oil, palm oil, peanut oil, rapeseed oil, olive oil, and canola oil. Useful first reactants may also include triglyceride derived from animal, such as fish oil.

The reactive sites (e.g., the carbon double bonds in the fatty acid chains) of a triglyceride may be epoxidized to create epoxidized sites, which may then be acrylated (i.e., reacted with an acrylic acid, methacrylic acid, acrylate, or methacrylate), as is known in the art, for example to create acrylated epoxidized triglyceride, for example acrylated epoxidized soybean oil (AESO) or acrylated epoxidized linseed oil (AELO).

The triglyceride of the first reactant may have an acrylate functionality of any one of at least 2.0, at least 2.5, at least 3.0, and at least 3.5. As used herein, "functionality" and "average functionality" refer to the average number of acrylate moieties on the triglyceride molecule. Preferred acrylated triglycerides will have a bio-carbon content of at least 50%, and more preferably at least 70%, where the percent bio-carbon is defined as 100× (number of bio-derived carbon atoms/total number of carbon atoms).

As used herein, "acrylate" includes acyrlates, methacrylates, and molecules having combinations of acrylate and methacrylate functionalities. "Acrylate functionalty" includes functionality provided by any of acrylate and methacrylate moieties. "Acrylate moieties" includes acrylate and methacrylate moieties.

Second Reactant

The mixture comprises a second reactant comprising diacrylate. As used herein, "diacrylate" means molecules other than triglyceride and having an acrylate functionality of 2 (that is, an average acrylate functionality of from 1.5 to 2.4).

Useful diacrylates of the second reactant include, for example, one or more of polyethylene glycol diacrylates, polypropylene glycol diacrylates, bisphenol A diacrylates, diacrylates derived from vegetable oil, and polyester diacrylates.

Useful polyethylene glycol diacrylate include PEG 200 diacrylate, PEG 400 diacrylate, and PEG 1000 diacrylate where the numbers represent the average molecular weight of the PEG segment.

Useful polypropylene glycol diacrylates include dipropylene glycol diacrylate, and tripropylene glycol diacrylate.

Useful bisphenol A diacrylates include ethoxylated bisphenol A diacrylate, such as those having 2, 3, and 4 or more moles of ethoxylation, and including bisphenol diacrylates and bisphenol A dimethacrylates.

Useful polyester diacrylates include polyester segments comprising aliphatic and aromatic moieties. When a more rigid foam is desired, polyester segments can be chosen that have a glass transition temperature ($T_g$) that is greater than room temperature. Similarly when a more flexible foam is desired the polyester segments can be selected with a $T_g$ below room temperature. Preferred polyester acrylates will also include bio-carbon content for example via the inclusion of poly(lactic acid) segments.

The mixture may comprise the second reactant (i.e., diacrylate) in an amount of at least any one of 6, 7, 8, 10, 12, 15, 17, and 20 weight parts of the second reactant relative to 100 weight parts of the first reactant. The mixture may comprise the second reactant in an amount of at most any one of 90, 80, 70, 60, 55, 50, 40, and 30 weight parts relative to 100 weight parts of the first reactant.

Third Reactant

The mixture may comprise a third reactant. The third reactant may comprise monoacrylate, that is, a molecule other than triglyceride having an acrylate functionality of one. Useful monoacrylates include one or more of isobornyl acrylate, fatty alcohol monoacrylate (e.g., lauryl acrylate), ethoxylated phenol monoacrylates (e.g., four-mole ethoxylated nonyl phenol acrylate), epoxy acrylates (e.g., glycidyl methacrylate), and acrylated fatty acid ester.

The third reactant may comprise triacrylate, that is, a molecule other than triglyceride having an average functionality of 3 (i.e., from 2.5 to 3.4). Useful triacrylates include polyester triacrylate. The third reactant may comprise a tetra-acrylate, that is, a molecule other than triglyceride having an average functionality of 4, such as polyester tetra-acrylate. Preferred polyester tri- and tetra-acrylates will have a bio-carbon content of at least 50%, for example via the inclusion of poly(lactic acid) segments.

The mixture may comprise the third reactant (e.g., monoacrylate) in an amount of at least any one of 6, 7, 8, 10, 12, 15, 17, and 20 weight parts of the third reactant relative to 100 weight parts of the first reactant. The mixture may comprise the third reactant in an amount of at most any one of 90, 80, 70, 60, 55, 50, 40, and 30 weight parts relative to 100 weight parts of the first reactant.

Surfactant

The mixture may further comprise surfactant. Useful surfactants include any of one or more of polysiloxanes (i.e., silicone surfactants and ethoxylated polysiloxane), ethoxylated fatty acids, salts of fatty acids, ethoxylated fatty alcohols, salts of sulfonated fatty alcohols, and fatty acid ester sorbitan ethoxylates (e.g., polysorbates available from Croda under the Tween trade name).

The mixture may comprise surfactant in an amount of at least any one of 0.01, 0.05, 0.1, 0.2, 0.3, and 0.4 weight parts surfactant, and/or at most any of 3, 1, 0.7, and 0.4 weight parts surfactant, relative 100 weight parts of the first reactant.

Blowing Agent

The mixture comprises blowing agent, such as physical blowing agent. A "physical blowing agent" is a blowing agent that does not require a chemical reaction to generate the foaming gas or vapor, the latter being characterized as a "chemical blowing agent." Useful physical blowing agents include one or more of inorganic blowing agents and organic blowing agents. Preferred blowing agents will have a sufficient solubility in the reactants to produce a low density foam. The solubility of gaseous blowing agents will typically increase with the pressure applied.

Useful inorganic blowing agents include one or more of carbon dioxide, nitrogen, argon, water, air, sulfur hexafluoride (SF(6)), and helium.

Useful organic blowing agents include one or more of aliphatic hydrocarbons having 1-9 carbon atoms, aliphatic alcohols having 1-3 carbon atoms, fully and partially halogenated aliphatic hydrocarbons (e.g., those having 1-4 carbon atoms), hydrofluorocarbons (HFCs), chlorofluorocarbons, hydrochlorofluorocarbons, and ketones, such as acetone.

Aliphatic hydrocarbons include methane, ethane, propane, n-butane, isobutane, n-pentane, isopentane, neopentane, cyclopentane and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbon blowing agents include methyl fluoride, perfluoromethane, ethyl fluoride, 1,1-difluoroethane (HFC-152a), fluoroethane (HFC-161), 1,1,1-trifluoroethane (HFC-143a), 1,1,1,2-tetrafluoroethane (HFC-134a), 1,1,2,2-tetrafluoroethane (HFC-134), 1,1,1,3,3-pentafluoropropane, pentafluoroethane (HFC-125), difluoromethane (HFC-32), perfluoroethane, 2,2-difluoropropane, 1,1,1-trifluoropropane, perfluoropropane, dichloropropane, difluoropropane, perfluorobutane, and perfluorocyclobutane. Partially halogenated chlorocarbon and chlorofluorocarbon blowing agents include methyl chloride, methylene chloride, ethyl chloride, 1,1,1-trichloroethane, 1,1-dichloro-1 fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,2-dichlorotetrafluoroethane (CFC-114), chloroheptafluoropropane, and dichlorohexafluoropropane.

The blowing agent of the mixture may comprise one or more of the foregoing blowing agents used alone or in combination. For example, the blowing agent may comprise a blend of from 35 to 65 weight % isobutane and from 35 to 65 weight % n-butane.

An amount of blowing agent is incorporated into the mixture sufficient to make a foam. For example, the amount of blowing agent added to the mixture may be at least any of the following: 0.05, 0.2, and 0.5 moles blowing agent per kilogram of the first reactant; and/or at most any of the following: 5, 3, and 2.5 moles blowing agent per kilogram of the first reactant. Also by way of example, the amount of blowing agent added to the mixture may be at least any of 0.5 parts, 1 part, 3 weight parts, and/or at most any of 80 parts, 30 parts, and 15 weight parts, based on 100 parts by weight of the first reactant.

The mixture may comprise water in an amount of at least, and/or at most, any of 0.4, 1, 2, 5, 8, 10, 15, and 20 weight parts water relative 100 weight parts of the first reactant.

Initiator

The mixture may comprise initiator. Useful initiators include thermally-activated initiators and radiation-activated initiators. Useful thermally-activated initiators include one or more of azo compounds, organic peroxides, such as any of diacyl peroxide, dilauroyl peroxide, benzoyl peroxide, tert-butyl benzoyl peroxide, dicumyl peroxide, dialkyl peroxide, peroxyesters, peroxydicarbonates, hydroperoxides, peroxymonocarbonates, peroxyketals, and methyl ethyl ketone peroxide. The thermally-activated initator may comprise more than one type of thermally-activated initiator, for example, a first thermally-activated initiator that activates at a first temperature (e.g., above at least 80° C.) and a second thermally-activated initiator that activates at a second temperature (e.g., above 100° C.) that is greater than the activation temperature of the first thermally-activated initiator.

The amount of thermally-activated initiator may be at least, and/or at most, any one of 0.1, 0.5, 1, 1.5, 2, 3, 4, and 5 weight parts thermally-activated initiator relative 100 weight parts first reactant.

Useful radiation-activated initiator includes one or more of visible or ultraviolet light-activated initiators, such as one or more of benzophenone, and its derivatives, such as methoxybenzophenone, dimethoxybenzophenone, dimethylbenzophenone, diphenoxybenzophenone, allyloxybenzophenone, diallyloxybenzophenone, dodecyloxybenzophenone, dibenzosuberone, 4,4'-bis(4-isopropylphenoxy) benzophenone, 4-morpholinobenzophenone, 4-aminobenzophenone, tribenzoyl triphenylbenzene, tritoluoyl triphenylbenzene, 4,4'-bis(dimethylamino)benzophenone, acetophenone and its derivatives, such as, o-methoxyacetophenone, 4'-methoxyacetophenone, valerophenone, hexanophenone, α-phenyl-butyrophenone, p-morpholinopropiophenone, benzoin and its derivatives, such as, benzoin methyl ether, benzoin butyl ether, benzoin tetrahydropyranyl ether, 4-o-morpholinodeoxybenzoin, substituted and unsubstituted anthraquinones, α-tetralone, acenaphthenequinone, 9-acetylphenanthrene, 2-acetyl-phenanthrene, 10-thioxanthenone, 3-acetyl-phenanthrene, 3-acetylindole, 9-fluorenone, 1-indanone, 1,3,5-triacetylbenzene, thioxanthen-9- one, isopropylthioxanthen-9-one, xanthene-9-one, 7-H-benz[de]anthracen-7-one, 1'-acetonaphthone, 2'-acetonaphthone, acetonaphthone, benz[a]anthracene-7,12-dione, 2,2-dimethoxy-2-phenylacetophenone, α,α-diethoxyacetophenone, α,α-dibutoxyacetophenone, 4-benzoyl-4'-methyl(diphenyl sulfide), bis acylphosphine oxides and the like. Single oxygen-generating photosensitizers such as Rose Bengal, methylene blue, and tetraphenylporphine as well as polymeric initiators such as poly(ethylene carbon monoxide) and oligo [2-hydroxy-2-methyl-1-[4-(1-methylvinyl)-phenyl]propanone] also can be used.

The amount of radiation-activated initiator may be at least, and/or at most, any one of 0.1, 0.5, 1, 1.5, 2, 3, 4, 5, and 10 weight parts radiation-activated initiator relative 100 weight parts first reactant.

Additives

The mixture may comprise one or more additives, such as one or more of promoter or accelerator (e.g., transition metal salts, tertiary amines, such as aromatic tertiary amines such as N-(2-hydroxylethyl)-N-methyl-p-toluidine), nucleating and/or reinforcing agent (e.g., cellulosic material such as cellulose fiber, wood pulp, powdered paper, natural clays and modified intercalated clays, and nanoparticles), flame retardant (e.g., ATH), aging modifier (e.g., fatty acid ester, fatty acid amide, hydroxyl amide), pigment, colorant, antioxidant, stabilizer, fragrance, and odor masking agent. The nucleating agent may assist in controlling the size of foam cells. The stabilizer may enhance dimensional stability of the foam. Exemplary stabilizers include amides and esters of C(10-24) fatty acids, stearyl stearamide, glyceromonostearate, glycerol monobehenate, and sorbitol monostearate.

Manufacture of the Foam

The components of the mixture are mixed together to create a mixture comprising the first and second reactants, blowing agent, and other components, for example by stirring in a mixing vessel or extruding in an extrusion mixer. Methods and devices for mixing components are known to those of skill in the art. The resulting mixture may be free of isocyanate reactants, such as those used in formulating polyurethane foams, so that the final foam of the present disclosure may be free from isocyanates or isocyanate residues.

The physical blowing agent may be added to the mixer and mixed at an elevated pressure, for example, a pressure at least any one of 200, 300, 350, 500, and 800 psig. The components and blowing agent are preferably mixed sufficiently to distribute and disperse the components.

The mixture is expanded to create a froth. A "froth" is the expanded mixture comprising reactants and other components before the reaction (polymerization or cure) of the reactants to form a foam having a solidified resin matrix surrounding the cellular structure. The mixture may be expanded to the froth by expanding from, for example, any one of the pressures listed in the previous paragraph, to, for example, ambient atmospheric pressure. The sudden reduction in pressure causes the blowing agent within the mixture to vaporize or expand into a plurality of cells within the mixture. As a result, the froth has "bubbles" or cells of the blowing agent gas suspended within the pre-reacted mixture.

The reactants (e.g., the first, second, and optional third or more reactants) of the froth are reacted to create a solidified matrix surrounding and entrapping blowing agent gas bubbles and creating the foam. Where initiator is used, the initiator is activated to initiate the reaction of the reactants as is known to those of skill in the field of polymer chemistry. Where a thermally-activated initiator is used, the froth is heated to a temperature sufficient to activate the initiator and facilitate the reaction of the first and second reactants (as well as any further reactants). Where the thermally-activated initiator comprises a first thermally-activated initiator that activates at a first temperature greater than the activation temperature of a second thermally-activated initiator, then the temperature of the reactants within the froth may be elevated in a controlled fashion to help control the rate of the curing reaction, as well as potentially extend the curing reaction.

Where a radiation-activated initiator is used, the froth is exposed to an amount and type of actinic radiation sufficient to activate the radiation-activated initiator. For example, if a visible or ultraviolet (UV) light activated initiator is used, then the froth may be exposed to visible or UV light accordingly using, for example, visible or UV lamps known to those of skill in the field.

If initiator is not used to facilitate the reaction of the reactants, then the froth may be exposed to actinic radiation such as electron beam radiation sufficient to initiate the reaction of the reactants to form the cured matrix. The dose and energy level for initiation of such reaction is readily determinable by those of skill in the field.

Foam

The resulting foam (i.e., cellular plastic) may have a density of at most, and/or at least, any one of 3.5, 3.0, 2.5, and 2.0 pounds per cubic foot (pcf). Unless otherwise noted, the density of the foam as used herein is the apparent density measured according to ASTM D1622-08, which is incorporated herein in its entirety by reference.

The resulting foam may have a compressive strength at 50% strain of at least any of the following: 0.5, 0.8, 1.0, 1.5, 2.0, and 2.5 psi, for example at from 10 to 50% compression. As used herein, the compressive strength is measured according to ASTM 1621-00, as modified by reference to 50% strain.

The foam may have a configuration, for example, of any of a sheet, plank, slab, block, board, and molded shape.

The foam may be used for any one or more of void fill, blocking or bracing, thermal insulation, cushioning, sound insulation or vibration dampening.

The following examples are presented for the purpose of further illustrating and explaining the present invention and are not to be taken as limiting in any regard. Unless otherwise indicated, all parts and percentages are by weight.

In the samples below, the following abbreviations are used:

"AESO-1" is an acrylated epoxidized soybean oil available from DynaChem Incorporated under the CBF trade name, believed to have an average acrylate functionality of about 3.6 and a glass transition temperature (by DSC) of 15° C.

"AESO-2" is an acrylated epoxidized soybean oil available from Cytec Industries Inc. (Smyrna, Ga.) under the Ebecryl 860 trade name and believed to have an acrylate functionality of 3.5 and a glass transition temperature (by DSC) of 13° C.

"Diacrylate-1" is a polyethylene glycol (200) diacrylate available from Sartomer (Exton, Pa.) under the SR-259 trade name.

"Diacrylate-2" is a polyethylene glycol (400) diacrylate available from Sartomer (Exton, Pa.) under the SR-344 trade name.

"Diacrylate-3" is a polyethylene glycol (1000) dimethacrylate available from Sartomer (Exton, Pa.) under the SR-740 trade name.

"Diacrylate-4" is a 2-mole ethoxylated bisphenol A dimethacrylate available from Sartomer (Exton, Pa.) under the SR-348 trade name.

"Diacrylate-5" is a tripropylene glycol diacrylate available from Sartomer (Exton, Pa.) under the SR-306F trade name.

"Diacrylate-6" is a polyester diacrylate available from Sartomer (Exton, Pa.) under the CN-2254 trade name and a glass transition temperature (by DSC) of 40° C.

"Diacrylate-7" is a diacrylate ester derived from vegetable oil available from Sartomer (Exton, Pa.) under the CD595 trade name and believed to have a glass transition temperature (by DSC) of 91° C. and to be a higher molecular weight analogue of 1,6-hexanediol diacrylate.

"Diacrylate-8" is a 2-mole ethoxylated bisphenol A dimethacrylate available from Sartomer (Exton, Pa.) under the SR-349 trade name.

"Acrylate-1" is iso-bornyl acrylate (monofunctional acrylate) available from Sartomer (Exton, Pa.) under the SR-506A trade name.

"Acrylate-2" is lauryl acrylate (monofunctional acrylate) available from Sartomer (Exton, Pa.) under the SR-335 trade name.

"Acrylate-3" is a four-mole ethoxylated nonyl phenol acrylate (monofunctional acrylate) available from Sartomer (Exton, Pa.) under the SR-504A trade name.

"Acrylate-4" is a methacrylated fatty acid ester (monofunctional acrylate) available from Dixie Chemical Co. (Pasadena, Tex.) under the MC-818 trade name.

"Triacrylate-1" is a polyester tri-acrylate available from Sartomer (Exton, Pa.) under the CN-2261 trade name and believed to have a functionality of 3 and a glass transition temperature (by DSC) of 56° C.

"Triacrylate-2" is a biobased polyester tri-acrylate available from Cytec Industries Inc. (Smyrna, Ga.) under the Ebecryl Bioligomer 5801 trade name and believed to have an acrylate functionality of 3.

"Tetra-acrylate-1" is a biobased polyester tetra-acrylate available from Cytec Industries Inc. (Smyrna, Ga.) under the Ebecryl Bioligomer 5820 trade name and believed to have an acrylate functionality of 4.

"Peroxide-1" is dilauroyl peroxide available from Arkema (King of Prussia, Pa.) under the PD-1104 trade name.

"Surfactant-1" is a silicone (polysiloxane) surfactant available from Evonik under the Tegostab B8863P trade name.

"Cellulose-1" is powdered paper having particles of an average length of about 30 micron available from Eco Research Institute, Ltd. (Tokyo, Japan).

"Cellulose-2 is wood pulp having particles of an average fiber length of about 90 micron available from Creafill Fibers Corp. under the TC-90 trade name.

"ATH" is aluminum trihydrate fire retardant.

"Additive-1" is aluminum magnesium hydroxide modified with rosin and saturated fatty acid available from Akzo Nobel under the Perkalite AF50 trade name.

"Additive-2" is halloysite, a naturally occurring aluminosilicate nanotube clay mineral $(Al_2Si_2O_5(OH)_4.2H_2O)$, a two-layered aluminosilicate mineral having a predominantly hollow tubular structure available from Applied Minerals Inc. under the Dragonite trade name.

"Additive-3" is sodium montmorillonite available from Southern Clay Products, Inc. under the Cloisite Na+ trade name.

Examples 1 To 17

The following foams were made using the following general procedure. As indicated in Tables 1 and 2, the reactants, initiator, surfactant, and other listed components (if any) were charged to a glass liner of a 300 cc Parr reactor equipped with a CO2 gas inlet, overhead mechanical stirrer, and a dip tube for discharging the mixture through a ⅜ inch (nominal) ball valve. For all of the Table 1 and 2 examples and comparatives, the initiator was Peroxide-1 (dilauroyl peroxide) in an amount of 1 wt. %; and the surfactant was Surfactant-1 in an amount of 0.2 wt. %, both amounts based on the total weight of reactants, initiator, surfactant, and other listed components (if any). The Peroxide-1 was typically dissolved in one of the acrylate components before mixing with the other components.

To de-oxygenate the vessel, the assembled reactor was first flushed with CO2 for several minutes at atmospheric pressure. The CO2 gas pressure was increased to 400 psig for several minutes followed by venting to the atmosphere. This was repeated two more times. The CO2 gas pressure in the vessel was then increased to 500 psig and the mixture was stirred for 30 minutes. The resulting mixture was discharged without stirring through the ball valve into a plastic beaker at atmospheric pressure to form a froth and was cured by heating the froth in a microwave oven (typically 45-60 seconds to initiate the cure) to form a foam. The resulting foam was cut with an electric knife into cylinders, which were measured and weighed to calculate the density.

TABLE 1

| Example No. (except as noted) | Reactants/Components wt. %* | Density (pcf) | Comments |
|---|---|---|---|
| Compare-1 | AESO1 - 98.8% | 4.0 | |
| Compare-2 | AESO-1 - 63.5%<br>Acrylate-2 - 35.3% | 7.3 | |
| Compare-3 | AESO-1-66.8%<br>Acrylate-1 - 32.0% | 4.2 | firmer foam |
| 1 | AESO-1 - 63.5%<br>Diacrylate-2 - 35.3% | 2.8 | soft foam |
| 2 | AESO-1 - 66.8%<br>Diacrylate-2 - 16.0%<br>Acrylate-1 - 16.0% | 3.1 | firmer foam |
| 3 | AESO-1 - 66.8%<br>Diacrylate-3 - 16.0%<br>Acrylate-3 - 16.0% | 1.8 | very soft foam |
| 4 | AESO-1 - 66.8%<br>Diacrylate-2 - 12.0%<br>Acrylate-1 - 16.0%<br>H2O - 4.0% | 1.3 | water further lowered density compared to Example 3 |
| 5 | AESO-1 - 66.8%<br>Diacrylate-2 - 11.0%<br>Diacrylate-6 - 10.0%<br>Acrylate-1 - 11.0% | 1.5 | firmer foam;<br>foam collapsed on cure then recovered |
| 6 | AESO-1 - 57.8%<br>Diacrylate-2 - 11.0%<br>Diacrylate-6 - 20.0%<br>Acrylate-1 - 10.0% | 2.4 | firmer foam;<br>foam collapsed on cure then recovered;<br>very fine cells |
| 7 | AESO-1 - 62.8%<br>Diacrylate-2 - 11.0%<br>Diacrylate-6 - 10.0%<br>Acrylate-1 - 1.0%<br>H2O - 4.0% | 1.4 | foam did not collapse on cure;<br>coarser cells;<br>lower density with water |

*wt. % based on the total weight of reactants, initiator (i.e., the 1% Peroxide-1), surfactant (i.e., the 0.2% Surfactant-1), water, and other components noted.

TABLE 2

| Example No. (except as noted) | Reactants/Components (wt. %)* | Density (pcf) | Comments |
|---|---|---|---|
| 8 | AESO-2 - 62.8%<br>Diacrylate-2 - 11.0%<br>Diacrylate-6 - 10.0%<br>Acrylate-1 - 11.0%;<br>H2O - 4.0% | 2.3 | coarser foam |
| 9 | AESO-2 - 66.8%<br>Diacrylate-1 - 11.0%<br>Diacrylate-6 - 10.0%<br>Acrylate-1 - 11.0% | 2.1 | finer cells |
| 10 | AESO-2 - 56.8%<br>Diacrylate-7 - 15.0%<br>Diacrylate-6 - 12.0%<br>Acrylate-1 - 15.0% | 2.0 | coarse cells |
| 11 | AESO-2 - 65.8%<br>Diacrylate-7 - 7.0%<br>Acrylate-1 - 25.0%<br>Cellulose-1 - 1.0% | 2.3 | firm foam;<br>fine cells |
| 12 | AESO-2 - 46.8%<br>Diacrylate-7 - 7.0%<br>Triacrylate-1 - 20.0%<br>Acrylate-1 - 25.0% | 2.5 | very firm foam;<br>fine cells |
| 13 | AESO-2 - 61.8%<br>Diacrylate-2 - 1.0%<br>Acrylate-1 - 11.0%<br>Tetra-acrylate-1 - 10.0%<br>H2O - 4.0%<br>Cellulose-1 - 1.0% | 1.9 | |
| 14 | AESO-2 - 61.8%<br>Diacrylate-2 - 11.0%<br>Acrylate-1 - 11.0%<br>Triacrylate-2 - 10.0%<br>H2O - 4.0%<br>Cellulose-1 - 1.0% | 1.6 | |
| 15 | AESO-2 - 66.8%<br>Diacrylate-4 - 8.0%<br>Acrylate-1 - 13.0%<br>Triacrylate-1 - 10.0%<br>Cellulose-1 - 1.0% | 2.1 | fine cells, very firm foam |
| 16 | AESO-2 - 66.8%<br>Diacrylate-8 - 8.0%<br>Acrylate-1 - 13.0%<br>Triacrylate-1 - 10.0%<br>Cellulose-1 - 1.0% | 1.8 | fine cells, very firm foam; cured well |
| 17 | AESO-2 - 66.8%<br>Diacrylate-5 - 16.0%<br>Acrylate-1 - 16.0% | 2.2 | fine cells, firm foam; cured well |

*wt. % based on the total weight of reactants, initiator (i.e., the 1% Peroxide-1), surfactant (i.e., the 0.2% Surfactant-1), water, and other components noted.

It was surprising and unexpected that the incorporation of diacrylate as a reactant with the acrylated triglyceride resulted in a foam having much lower density compared to foams created with reactant of just acrylated triglyceride or foams created with reactants of acrylated triglyceride and a monoacrylate. For example, the Example 1 foam had a density of 2.8 pcf, significantly and surprisingly lower than the foams made without the use of a diacrylate reactant, such as Compare-1 having a density of 4.0 pcf and Compare-2 having a density of 7.3 pcf. This is an advantage, for example, in allowing the production of lower density foams for applications where low weight (i.e., low density) foams are useful while still using a sustainably-produced reactant such as acrylated triglyceride in the manufacture of the foam.

Examples 18 To 29

The following foams (Tables 3 and 4) were made following a similar process as that set forth for the previous set of examples, except using a 2-liter Parr reactor and using a ⅜-inch (nominal) ball valve for discharge except where noted. The amount of Peroxide-1 initiator was in the range of from 0.05 to 0.2 weight %; and the amount of Surfactant-1 was as noted in Table 3 and 4.

TABLE 3

| Example No. (except as noted) | Reactants/Components wt. %** | Density (pcf) | Compressive Strength at 50% strain (psi) | Comments |
|---|---|---|---|---|
| Compare-4 | AESO-1 - 100%<br>Surfactant - 0.1 pph | 8.62 | 1.94 | Dispensed from needle valve rather than ball valve. |
| Compare-5 | AESO-1 - 100%<br>Surfactant - 0.1 pph | 7.50 | 1.73 | Dispensed from needle valve rather than ball valve. |
| 18 | AESO-1 - 65%<br>Diacrylate-2 - 17.5%<br>Acrylate-1 - 17.5%<br>Surfactant -- 0.1 pph | 4.38 | 0.38 | Dispensed from needle valve rather than ball valve; hard foam. |
| 19 | AESO-1 - 65%<br>Diacrylate-2 - 17.5%<br>Acrylate-1 - 17.5%<br>Surfactant -- 0.1 pph | 2.77 | 0.39 | soft foam |
| 20 | AESO-1 - 74%<br>Diacrylate-1 - 13%<br>Acrylate-1 - 13%<br>Surfactant -- 0.07 pph | 1.47 | 0.08 | soft foam |
| 21 | AESO-1 - 74%<br>Diacrylate-3 - 13%<br>Acrylate-1 - 13%<br>Surfactant -- 0.07 pph | 1.46 | 0.25 | soft foam |
| 22 | AESO-1 - 74%<br>Diacrylate-3 - 13%<br>Acrylate-1 - 13%<br>Surfactant -- 0.13 pph | 1.25 | 0.24 | soft foam |
| 23 | AESO-1 - 74%<br>Diacrylate-3 - 13%<br>Acrylate-1 - 13%<br>Surfactant -- 0.1 pph | 1.19 | 0.23 | soft foam |

**Weight percent based on the total of the reactants; excluding surfactant, initiator, and other components unless noted. Surfactant amount is in weight parts per hundred weight parts of the reactants.

In the above Table 3, it is believe that for Example 18, Compare-4, and Compare-5, the use of a needle valve for discharging the pressurized mixture caused excessive shear on the mixture and negatively affected the resulting foam. For all other comparatives and examples, a ball valve was used to discharge the pressurized mixture through an opening much less restrictive than that of the needle valve used.

TABLE 4

| Example No. (except as noted) | Reactants/Components wt. %** | Density (pcf) | Compressive Strength at 50% strain (psi) | Comments |
|---|---|---|---|---|
| Compare-6 | AESO-2 - 100%<br>Surfactant - 0.1 pph | 6.68 | 1.71 | |
| Compare-7 | AESO-2 - 100%<br>Surfactant - 0.1 pph | 6.94 | 2.50 | |
| 24 | AESO-2 - 90%<br>Diacrylate-2 - 5%<br>Acrylate-1 - 5%<br>Surfactant -- 0.07 pph | 5.8 | 0.76 | soft foam |
| 25 | AESO-2 - 74%<br>Diacrylate-2 - 13%<br>Acrylate-1 - 13%<br>Surfactant -- 0.08 pph | 3.29 | 0.66 | soft foam |

TABLE 4-continued

| Example No. (except as noted) | Reactants/Components wt. %** | Density (pcf) | Compressive Strength at 50% strain (psi) | Comments |
|---|---|---|---|---|
| 26 | AESO-2 - 74%<br>Diacrylate-3 - 13%<br>Acrylate-1 - 13%<br>Surfactant -- 0.07 pph | 2.15 | 0.76 | soft foam |
| 27 | AESO-2 - 74%<br>Diacrylate-4 - 13%<br>Acrylate-1 - 13%<br>Surfactant -- 0.1 pph | 9.58 | 36.81 | Very hard and strong foam. |
| 28 | AESO-2 - 74%<br>Diacrylate-3 - 8.2%<br>Diacrylate-4 - 4.8%<br>Acrylate-1 - 13%<br>Surfactant -- 0.1 pph | 3.31 | 1.60 | Soft and strong foam. |
| 29 | AESO-2 - 74%<br>Diacrylate-3 - 8.2%<br>Acrylate-1 - 6.6%<br>Surfactant -- 0.1 pph | 2.97 | 2.72 | Soft and strong foam. |
| Compare-9 | AESO-2 - 74%<br>Acrylate-4 - 18.4%<br>Acrylate-1 - 6.6%<br>Surfactant -- 0.1 pph | 5.68 | 2.93 | Soft and strong foam. |

**Weight percent based on the total of the reactants; excluding surfactant, initiator, and other components unless noted. Surfactant amount is in weight parts per hundred weight parts of the reactants.

For comparison, the transmitted shock at 0.4 psi static load for the Example 29 foam from a given drop height was measured as 31 G and 33 G, according to ASTM D4168. The transmitted shock at 0.4 static load for the Compare-9 foam from the same drop height was measured at 58 G and 74 G by the same standard.

Examples 30 To 37

The following foams (Table 5) were made using similar conditions and procedures as noted above with the previous set of examples, but with the additives (cellulose, etc.) noted below also charged to the reactor along with the other components. The initiator was Peroxide-1 (dilauroyl peroxide) in an amount of 1 wt. %; and the surfactant was Surfactant-1 in an amount of 0.2 wt. %, both amounts based on the total weight of reactants, initiator, surfactant, and other listed components.

TABLE 5

| Example No. | Reactants/Components wt. %* | Density (pcf) | Comments |
|---|---|---|---|
| 30 | AESO-1 - 65.8%<br>Diacrylate-2 - 12%<br>Acrylate-1 - 16%<br>H2O - 4%<br>Additive-2 - 1% | 1.6 | fine cells, slightly firmer |
| 31 | AESO-1 - 65.8%<br>Diacrylate-2 - 12%<br>Acrylate-1 - 16%<br>H2O - 4%<br>Cellulose-2 - 1% | 1.5 | fine cells, slightly firmer |
| 32 | AESO-1 - 65.8%<br>Diacrylate-2 - 16%<br>Acrylate-1 - 16%<br>Cellulose-1 - 1% | 2.0 | fine cells, slightly firmer |
| 33 | AESO-1 - 65.8%<br>Diacrylate-2 - 16%<br>Acrylate-1 - 16%<br>Additive-1 - 1% | 2.0 | fine cells, slightly firmer |
| 34 | AESO-1 - 65.8%<br>Diacrylate-2 - 12% | 1.4 | fine cells, slightly firmer; cured well |
| 35 | Acrylate-1 - 16%<br>H2O - 4%<br>Cellulose-1 - 1%<br>AESO-1 - 65.8%<br>Diacrylate-2 - 12%<br>Acrylate-1 - 16%<br>H2O - 4%<br>ATH - 1% | 1.6 | fine cells, slightly firmer |
| 36 | AESO-1 - 65.8%<br>Diacrylate-2 - 16%<br>Acrylate-1 - 16%<br>Additive-3 - 1% | 2.3 | fine cells, cured well |
| 37 | AESO-1 - 61.8%<br>Diacrylate-2 - 16%<br>Acrylate-1 - 16%<br>Cellulose-1 - 5% | 2.2 | firmer, fine cells, cured well |

*wt. % based on the total weight of reactants, initiator, surfactant, and other noted components.

Any numerical value ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and/or at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present Application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

What is claimed is:
1. A method of making a foam comprising:
    (1) creating a mixture comprising:
        (i) a first reactant comprising triglyceride having acrylate functionality;
        (ii) a second reactant comprising diacrylate; and
        (iii) a blowing agent;

(2) expanding the mixture to create a froth; and
(3) reacting the first and second reactants of the froth to create the foam.

2. The method of claim 1 wherein the mixture comprises at least 6 weight parts of the second reactant and at most 90 weight parts of the second reactant, all weight parts relative to 100 weight parts of the first reactant.

3. The method of claim 1 wherein the diacrylate is selected from one or more of polyethylene glycol diacrylate, propylene glycol diacrylate, bisphenol A diacrylate, or polyester diacrylate.

4. The method of claim 1 wherein the mixture further comprises a third reactant comprising monoacrylate and further comprising reacting the first, second, and third reactants of the froth to create the foam.

5. The method of claim 4 wherein the mixture comprises at least 6 weight parts of the third reactant and at most 90 weight parts of the third reactant, all weight parts relative to 100 weight parts of the first reactant.

6. The method of claim 5 wherein the monoacrylate is selected from one or more of iso-bornyl acrylate, fatty acid monoacrylate, ethoxylated phenol monoacrylate, or acrylated fatty acid ester.

7. The method of claim 1 wherein the mixture further comprises surfactant in an amount of at least 0.01 weight parts and at most 3 weight parts, all relative to 100 weight parts of the first reactant.

8. The method of claim 7 wherein the surfactant is selected from one or more of polysiloxane, ethoxylated fatty acid, ethoxylated fatty alcohol, or sorbitan ethoxylate.

9. The method of claim 1 wherein the triglyceride has an acrylate functionality of at least 2.

10. The method of claim 1 wherein the triglyceride comprises acrylated epoxidized triglyceride.

11. The method of claim 1 wherein the mixture further comprises thermally-activated initiator and the reacting step further comprises heating the froth to a temperature sufficient to activate the thermally-activated initiator.

12. The method of claim 11 wherein the thermally-activated initator comprises a first thermally-activated initiator that activates at a first temperature and a second thermally-activated initiator that activates at a second temperature that is greater than the activation temperature of the first thermally-activated initiator.

13. The method of claim 1 wherein the mixture comprises actinic radiation-activated initiator and the reacting step further comprises exposing the froth to an amount and type of radiation sufficient to activate the radiation-activated initiator.

14. The method of claim 1 wherein the reacting step further comprising exposing the froth to electron beam radiation to initiate the reaction.

15. The method of claim 1 wherein the blowing agent comprises a physical blowing agent selected from inorganic blowing agent and organic blowing agent.

16. The method of claim 15 wherein the physical blowing agent expands from a pressure of at least 200 psig.

17. The method of claim 1 wherein the froth is exposed to atmospheric pressure during the reaction step.

18. The method of claim 1 wherein the resulting foam has a density of at most 3.5 pounds per cubic foot.

19. The method of claim 1 wherein the mixture further comprises water in an amount of at least 0.4 weight parts and at most 20 weight parts water, all relative to 100 weight parts of the first reactant.

20. The method of claim 1 wherein the mixture further comprises cellulosic material.

21. A foam made by the method of claim 1.

22. The method of claim 1 wherein the triglyceride has an acrylate functionality of at least 3.

23. The method of claim 1 wherein the mixture is free of isocyanate reactants.

* * * * *